United States Patent
Florek

(10) Patent No.: US 6,696,776 B2
(45) Date of Patent: Feb. 24, 2004

(54) CATHODE RAY TUBE COUPLER WITH GROUNDING RIBBS

(75) Inventor: John J. Florek, Hunker, PA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 133 days.

(21) Appl. No.: 09/823,608

(22) Filed: Mar. 30, 2001

(65) Prior Publication Data

US 2002/0140332 A1 Oct. 3, 2002

(51) Int. Cl.$^7$ ................................................. H01J 29/86
(52) U.S. Cl. .............................. 313/35; 313/44; 313/36; 313/46
(58) Field of Search ............................. 313/35, 479, 36, 313/44, 46; 439/92, 95, 97, 801; 174/53, 51; 411/162, 163; 348/748, 776, 825, 801, 805

(56) References Cited

U.S. PATENT DOCUMENTS

| | | | | |
|---|---|---|---|---|
| 2,179,575 A | * | 11/1939 | Hosking | 151/35 |
| 2,778,399 A | * | 1/1957 | Mroz | 151/35 |
| 6,024,586 A | * | 2/2000 | Kumagai | 439/95 |
| 6,130,497 A | | 10/2000 | Takezawa et al. | 313/35 |

* cited by examiner

*Primary Examiner*—Alexander Gilman
(74) *Attorney, Agent, or Firm*—Mayer Fortkort & Williams, PC; Karin L. Williams, Esq.

(57) ABSTRACT

A coupler for coupling a projection lens to a cathode ray tube consists of a metallic plate having a first side and a second side, the first side for mounting to the faceplate of the cathode ray tube in a fluid tight relationship and the second side for mounting to a lens plate. The metallic plate is covered with a non-reflective coating and has at least one through hole for mounting to CRT rails. A plurality of ribbs protrude from the second side of the metallic plate from at least one of the at least one through holes and the ribbs surround the through hole. Upon mounting of a fastening device in the at least one through hole, the fastening device comes into contact with a top surface of the ribbs and the non-reflective coating is removed from the ribbs, thereby forming a ground connection for the coupler.

22 Claims, 6 Drawing Sheets

CATHODE RAY TUBE COUPLER WITH GROUNDING RIBBS

FIELD OF THE INVENTION

The present invention relates generally to projection televisions, and more particularly to a cathode ray tube coupler with grounding ribbs to provide electrical grounding and reduce picture abnormalities.

BACKGROUND OF THE INVENTION

Projection televisions (PTV's) are well known. A projection TV CRT typically has a flat front glass faceplate, a die-case aluminum coupler and a projection lens assembly for correcting the curvature of an image field. An image displayed on the front glass plate of the projection TV CRT is projected through the coupler and the lens onto a screen.

Rear projection type television receivers are very popular due to the large display screens that are available without the need for special installations and/or large viewing areas. In such receivers, the CRTs project the image onto a mirror, with the image being reflected (and magnified) onto the viewing screen.

In general, a projection television set includes three color cathode ray tubes (CRTs), corresponding to the primary colors, red, green and blue. A plurality of lens elements make up the projection lens assembly that magnifies the image appearing on the CRT faceplate and projects it onto a viewing screen. The CRT-to-lens coupler is utilized to couple the projection lens assembly to the faceplate of the CRT.

A typical coupler is provided with a circular opening in its central portion to receive a lens and side walls defining a rectangular space behind the circular opening, namely on the side of the projection CRT with respect to the circular opening. The lens is held in place by the coupler.

Each of the three CRTs in a projection television is typically operated at maximum power so as to maximize the intensity and to produce maximum light output at the faceplate. This, together with the fact that each of the CRTs is located within the projection television enclosure, tends to generate considerable heat. The lens system is therefore exposed to the elevated temperatures, causing thermally induced expansion of the components in the system (i.e., the focus of the lens system will change as the ambient temperature increases) leading to a variety of distortions.

Modern consumer rear-screen projection televisions typically utilize liquid coupling of the projection optics to the CRT faceplates to enhance contrast and to avoid localized hot spots on the CRT which may result in CRT failure. The space sealed by the projection TV CRT, the lens and the side walls is filled with a cooling liquid to cool the front glass plate and to couple the front glass plate and the lens optically. The coupling of the optics and the CRT is accomplished by way of the metal coupler (die cast or stamped aluminum) which has a durable surface. The coupler is often coated with a nonreflective dark matte finish (e.g. black paint), so as to (1) improve contrast by reducing reflections, and (2) prevent the aluminum casting from corroding.

Specifically, referring now to FIG. 1, a cross-sectional view of a conventional CRT unit 1 for use in a projection television CRT system is shown. CRT unit 1 comprises CRT body 2 with front surface 2A, a die cast coupler 3 with opening portion 4 and lens 5. Cooling liquid 6 is filled into the space defined by panel front surface 2A, coupler 3 and lens 5.

Focusing specifically on the coupler 3, FIG. 2 provides a more detailed perspective view of coupler 3 as seen from the front side thereof, illustrating through holes 23 provided on each of the four corners of flange portion 3B to mount the coupler to CRT rails so as to correctly position the CRT within the television chassis.

However, a problem exists in that in all of the various known coupler systems, a static charge is produced on the glass and also on the coupler itself. As the coupler has a floating ground, i.e., it is not tied to any part of the structure or referenced to any other potential, the static charge of the coupler causes intermittent picture abnormalities.

Accordingly, it would be desirable to provide a CRT coupler that does not have a floating ground, but rather is electrically grounded to the chassis of the television itself, thereby eliminating any picture abnormalities created by the build up of static charge on the coupler. Any improvement of the conventional coupler systems should also be inexpensively manufactured, maintain excellent optical and mechanical coupling characteristics and continue to allow the coupler to be easily installed and removed from the assembly.

SUMMARY OF THE INVENTION

In view of the foregoing, it is an object of the present invention to provide a commercially usable metal coupler, for coupling a projection lens to a cathode ray tube, that is grounded to the projection television set.

In accordance with the present invention, a CRT coupler for coupling a projection lens to a cathode ray tube consists of a metallic plate having a first side and a second side, the first side for mounting to the faceplate of the cathode ray tube in a fluid tight relationship, and the second side for mounting to a lens plate. The metallic plate is covered with a non-reflective coating and has at least one through hole for mounting to CRT rails. A plurality of ribbs protrude from the second side of the metallic plate at at least one of the at least one through holes and the ribbs surround the through hole. Upon mounting of a fastening device in the through hole, the fastening device comes into contact with a top surface of the ribbs and the non-reflective coating is removed from the ribbs, thereby forming a ground connection for the coupler.

In one embodiment, the metallic plate has four corners and has a through hole at each of the four corners for mounting to CRT rails. The plurality of ribbs may surround only one of the four through holes, or may surround more than one of the four through holes.

In another embodiment grounding ribbs are integral to the coupler and in yet another embodiment the coupler is covered with a dark matte finish. The fastening device may be a screw and a pair of leaf springs may be used to mount the faceplate of the CRT to the first side of the coupler.

In a further embodiment of the invention, a projection television assembly includes a CRT having a faceplate at an end of the CRT on which an image is displayed, a coupler having a first side and a second side, the first side fixed to the faceplate of the CRT and a lens having a lens plate fixed to the second side of the coupler. The coupler is covered with a non-reflective coating and has at least one through hole for mounting to CRT rails, and a plurality of ribbs, surrounding at least one of the through holes, protrude from the second side of the coupler. Upon mounting of a fastening device in the through hole, the fastening device comes into contact with a top surface of the ribbs and the non-reflective coating is removed from the ribbs, thereby forming a ground connection for the coupler to the projection television assembly.

DETAILED DESCRIPTION

Figure 3:
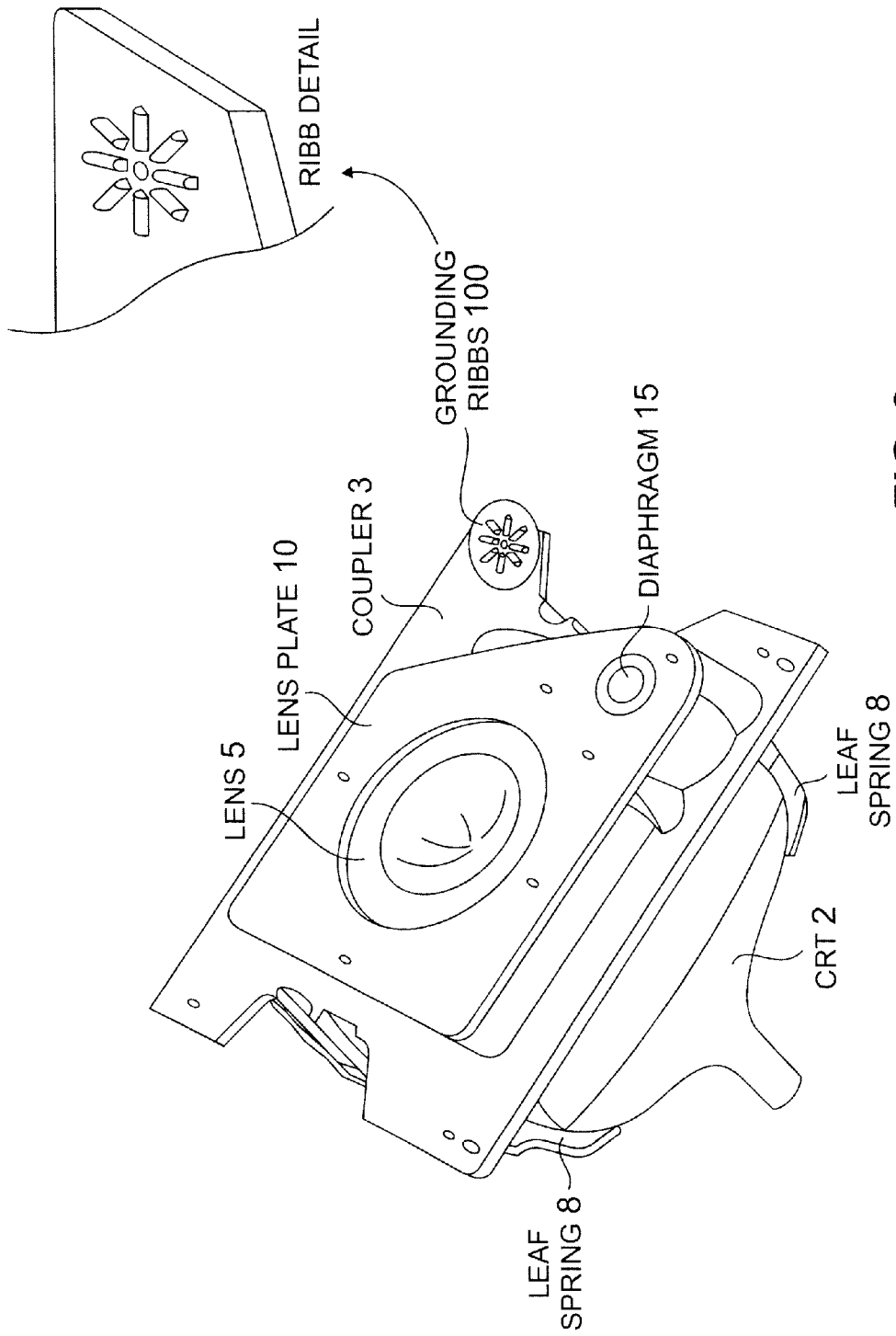
FIG. 3 shows a perspective view of a CRT coupled to a coupler that includes grounding ribbs according to the present invention.

Referring to FIG. 3, the concept of the present invention is illustrated. Specifically, FIG. 3 shows a basic illustration of a mechanical seal assembly of a CRT body and lens assembly. The coupler 3 is fixed to the CRT body 2 by a leaf spring 8 so as to be tightly contacted on the panel front surface of the CRT body. The lens 5 is fixed to the coupler 3 by a lens plate 10 so as to also be tightly in contact with the coupler 3. Diaphragm 15 acts as a pressure regulating valve to regulate the pressure of the cooling liquid. Diaphragm 15 is held by the lens plate 10.

Figure 1:
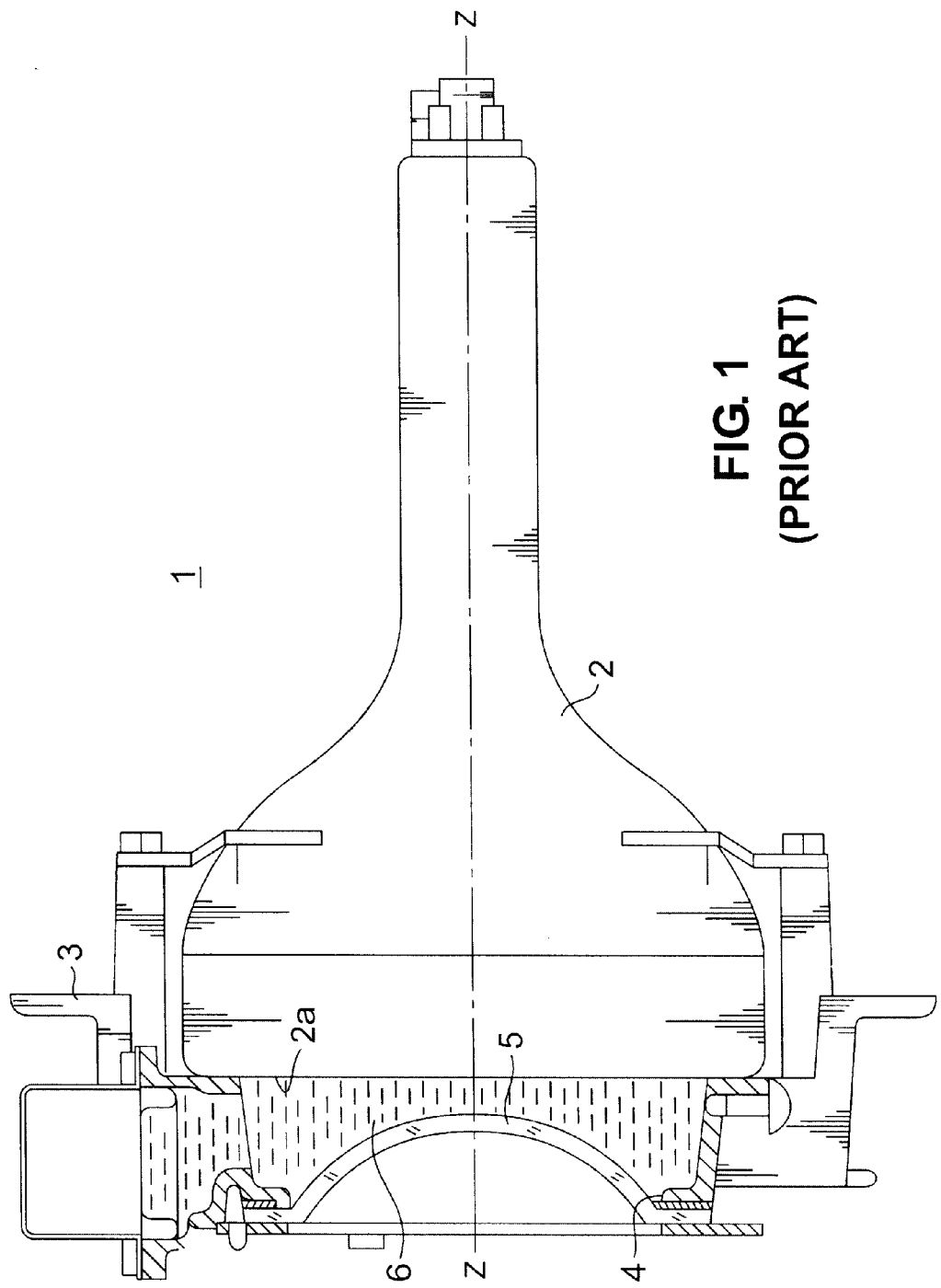
FIG. 1 shows a cross-sectional view of a conventional CRT unit 1 for use in a projection television CRT system.
Figure 2:
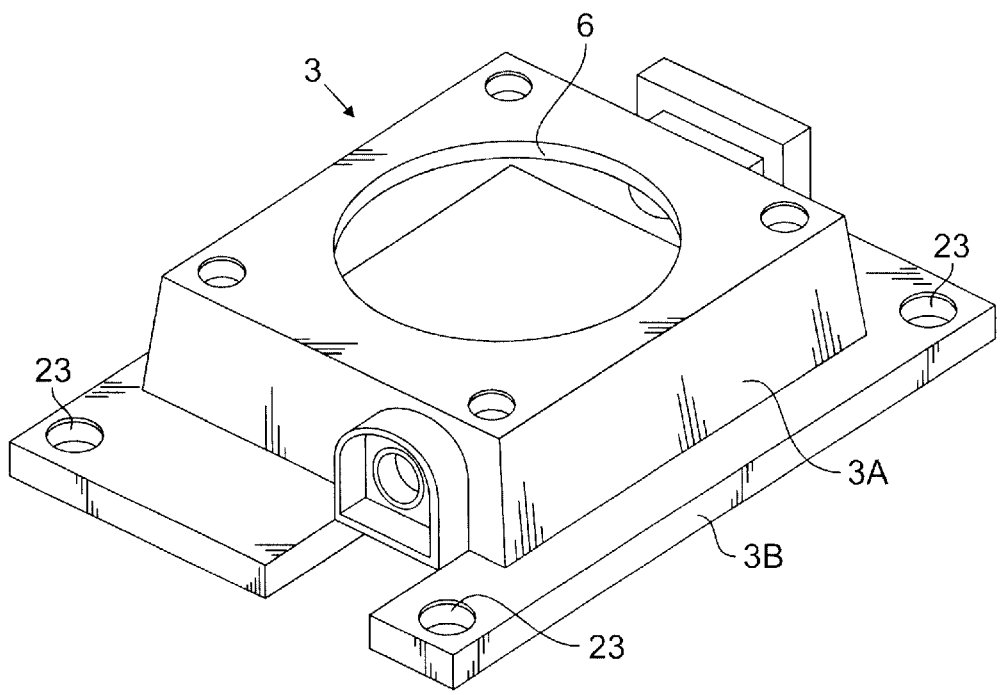
FIG. 2 provides a more detailed perspective view of coupler 3 as seen from the front side thereof.
Figure 4A:
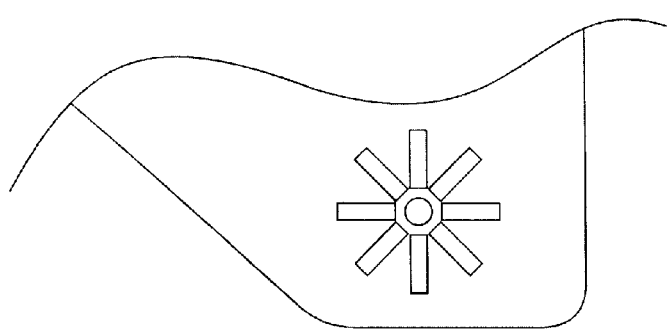
FIGS. 4a–4c show, respectively, the top, side and ortho views of grounding ribbs in a CRT coupler in accordance with the present invention.
Figure 4B:
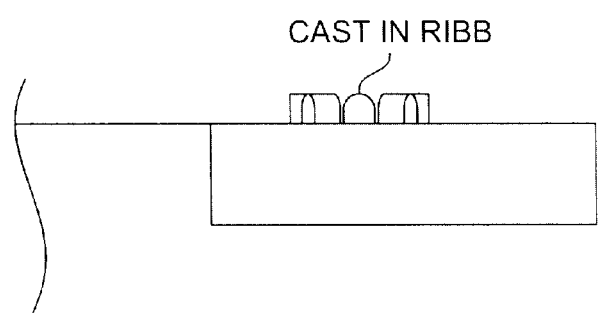
Figure 4C:
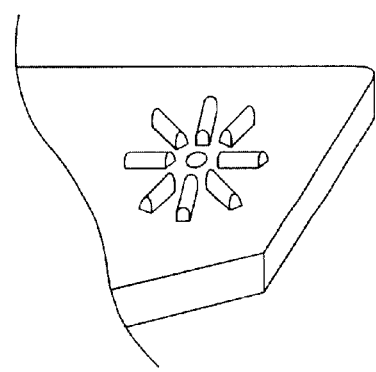

One of the four through holes at one of the four corners of the coupler includes grounding ribbs 100 that are illustrated in greater detail in FIGS. 4a–4c. Each of the perspectives shown in FIGS. 4a–4c illustrate a single corner through hole of a corner portion of a coupler (such as the exemplary coupler shown in FIG. 2) provided to couple the CRT into a projection television set in a conventional manner known to those skilled in the art.

The coupler is typically made of dye-cast aluminum and is covered with a dye or paint which imparts a dark color, e.g a black color, to the member so that the member does not reflect substantial amounts of light from the CRT into the projection lens. Implemented into the coupler, in at least one of the corner through holes, are grounding ribbs. The ribbs are constructed as part of the coupler plate and slightly protrude from the flat plate remainder of the surface of the coupler. A metal mold may be used to form the coupler including the ribbs.

Figure 5:
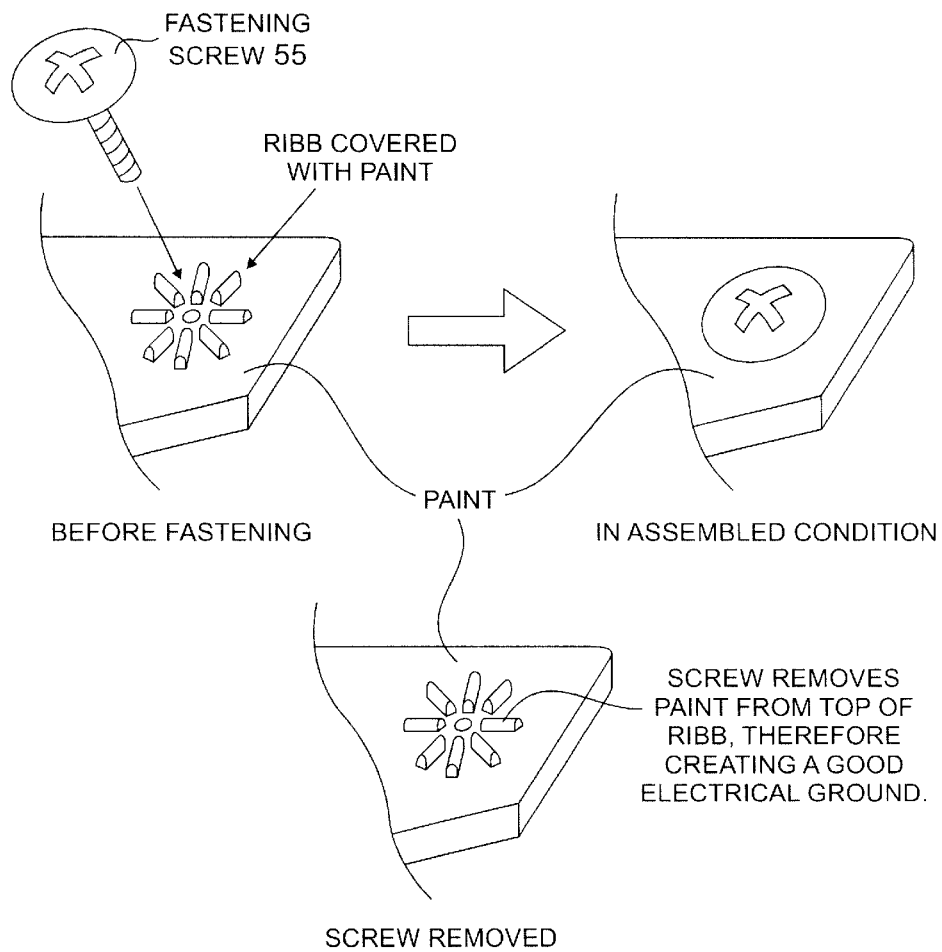
FIG. 5 shows a CRT coupler during the use of grounding ribbs to ground the coupler in accordance with features of the present invention.

As illustrated in FIG. 5 at the time of assembly using such a coupler, a fastening device, such as a screw 55, is inserted into each through hole and the screw tightening process is performed. As the head of the screw comes into contact with the raised ribbs, the paint (or dark colored dye) is removed from the ribbs, thereby creating a good electrical ground for the coupler, which eliminates picture abnormalities created by the build up of static charge on the coupler. The implementation of ribbs into a coupler at manufacture is inexpensive and allows the coupler to maintain excellent optical and mechanical coupling characteristics.

Figure 6:
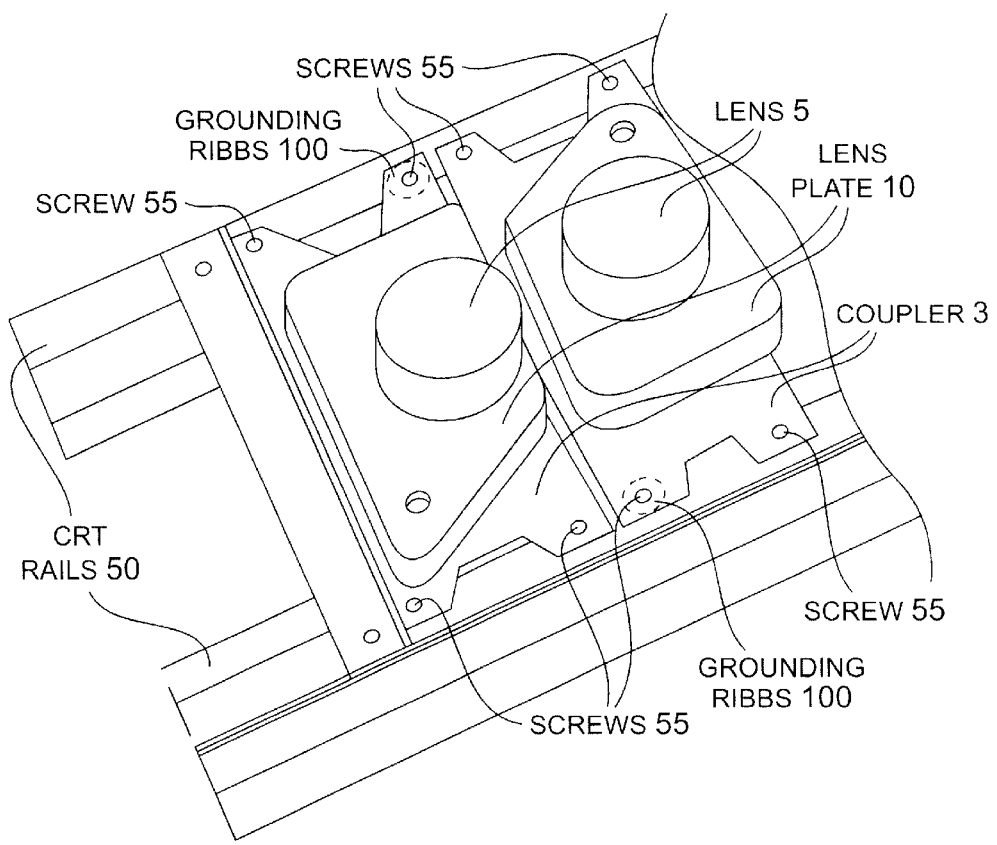
FIG. 6 shows a perspective view of two CRTs mounted to CRT rails, each CRT having a coupler with ribbs in accordance with features of the present invention.

FIG. 6 shows two CRT units mounted to CRT rails, using couplers having ribbs according to the present invention, within a television chassis. Specifically, when affixing each CRT unit into the television chassis, a fastening screw passes through each of the through holes located in each corner of the coupler so as to mount the CRT assembly to CRT rails 50. A fastening device, such as screw 55, is inserted into each through hole 23 (hidden by the screws 55 in FIG. 6 but illustrated in FIG. 2) and the screw tightening process is performed. As the head of the screw comes into contact with the raised ribbs 100, the paint is removed from the ribbs, thereby creating a good electrical ground. The coupler 3, sealed to the face of the CRT is thereby coupled into the television. As noted earlier with reference to FIG. 3, conventional fastening hardware may be used to mount the CRT and the coupler to one another.

Although the invention has been described in terms of a rear projection television, the coupler including ribbs, as disclosed herein, can also of course be used with front projection televisions, which differ in that they do not include a mirror or a screen as part of the cabinet but otherwise operate in the same basic manner as a rear projection television set.

In addition, although various embodiments are specifically illustrated and described herein, it will be appreciated that modifications and variations of the present invention are covered by the above teachings and are within the purview of the appended claims without departing from the spirit and intended scope of the invention. For example, alternative metals such as zinc, copper and other aluminum alloys may be used to form the coupler, and any non-conductive coating could be used to coat the coupler.

What is claimed is:

1. A coupler for coupling a projection lens to a cathode ray tube, the coupler comprising:
   a metallic plate having a first side and a second side, said first side for mounting to the faceplate of the cathode ray tube in a fluid tight relationship, and said second side for mounting to a lens plate,
   wherein said metallic plate is covered with a non-reflective coating and has at least one through hole for mounting to CRT rails; and
   a plurality of ribbs protruding from the second side of said metallic plate at said at least one through hole, said ribbs surrounding said through hole,
   wherein upon mounting of a fastening device in said at least one through hole, said fastening device comes into contact with a top surface of said ribbs and the non-reflective coating is removed from said ribbs, thereby forming a ground connection for the coupler.

2. A coupler according to claim 1, wherein said plurality of ribbs are integral to the coupler.

3. A coupler according to claim 1, wherein said coupler is mounted in a rear projection television.

4. A coupler according to claim 1, wherein said coupler is mounted in a front projection television.

5. A coupler according to claim 1, wherein said coupler is covered with a dark matte finish.

6. A coupler according to claim 1, wherein said fastening device is a screw.

7. A coupler according to claim 1 wherein a leaf spring mounts the faceplate of the CRT to the first side of the coupler.

8. A coupler according to claim 1, wherein the lens plate includes a diaphragm for regulating the pressure of a cooling liquid sealed by the CRT faceplate, the lens plate and side walls.

9. A coupler according to claim 1, wherein said metallic plate has four corners and has a through hole at each of the four corners for mounting to CRT rails.

10. A coupler according to claim 9, wherein said plurality of ribbs surround only one of the four through holes.

11. A coupler according to claim 9, wherein said plurality of ribbs surround more than one of the four through holes.

12. A projection television assembly comprising:
   a CRT having a faceplate at an end of the CRT on which an image is displayed;
   a coupler having a first side and a second side, the first side fixed to the faceplate of said CRT; and
   a lens having a lens plate fixed to the second side of said coupler;
      wherein said coupler is covered with a non-reflective coating and has at least one through hole for mounting to CRT rails, and
      further wherein a plurality of ribbs protrude from the second side of said coupler at said at least one through hole and said ribbs surround said through hole, and
      further wherein upon mounting of a fastening device in said at least one through hole, said fastening device comes into contact with a top surface of said ribbs and the non-reflective coating is removed from said ribbs, thereby forming a ground connection for the coupler to the projection television assembly.

13. An assembly according to claim 12, wherein said plurality of ribbs are integral to the coupler.

14. An assembly according to claim 12, wherein said coupler is mounted in a rear projection television.

15. An assembly according to claim 12, wherein said coupler is mounted in a front projection television.

16. An assembly according to claim 12, wherein said coupler is covered with a dark matte finish.

17. An assembly according to claim 12, wherein said fastening device is a screw.

18. An assembly according to claim 12 wherein a leaf spring mounts the faceplate of the CRT to the first side of the coupler.

19. An assembly according to claim 12, wherein the lens plate includes a diaphragm for regulating the pressure of a cooling liquid sealed by the CRT faceplate, the lens plate and side walls.

20. An assembly according to claim 12, wherein said coupler has four corners and has a through hole at each of the four corners for mounting to CRT rails.

21. An assembly according to claim 20, wherein said plurality of ribbs surround only one of the four through holes.

22. An assembly according to claim 20, wherein said plurality of ribbs surround more than one of the four through holes.

* * * * *